(12) United States Patent
Fukunaga et al.

(10) Patent No.: US 10,072,318 B2
(45) Date of Patent: Sep. 11, 2018

(54) RAPID HEATING APPARATUS OF CONTINUOUS ANNEALING LINE

(71) Applicant: JFE STEEL CORPORATION, Tokyo (JP)

(72) Inventors: Takayuki Fukunaga, Kurasiki (JP); Isao Akagi, Kurashiki (JP)

(73) Assignee: JFE STEEL CORPORATION, Tokyo (JP)

( * ) Notice: Subject to any disclaimer, the term of this patent is extended or adjusted under 35 U.S.C. 154(b) by 147 days.

(21) Appl. No.: 14/423,487

(22) PCT Filed: Sep. 2, 2013

(86) PCT No.: PCT/JP2013/073558
§ 371 (c)(1),
(2) Date: Feb. 24, 2015

(87) PCT Pub. No.: WO2014/034931
PCT Pub. Date: Mar. 6, 2014

(65) Prior Publication Data
US 2015/0211089 A1    Jul. 30, 2015

(30) Foreign Application Priority Data

Sep. 3, 2012 (JP) ................................ 2012-192936
Sep. 3, 2012 (JP) ................................ 2012-192940

(51) Int. Cl.
*C21D 9/60* (2006.01)
*C21D 9/46* (2006.01)
(Continued)

(52) U.S. Cl.
CPC ................. *C21D 9/60* (2013.01); *C21D 1/26* (2013.01); *C21D 1/42* (2013.01); *C21D 8/12* (2013.01);
(Continued)

(58) Field of Classification Search
CPC ............... C21D 1/42; C21D 9/46; C21D 9/60
(Continued)

(56) References Cited

U.S. PATENT DOCUMENTS 6,180,933 B1 *  1/2001  Demidovitch ......... H05B 6/067
                                                       219/645
2010/0101690 A1   4/2010  Koga et al.
(Continued)

FOREIGN PATENT DOCUMENTS

CN          101652485 A     2/2010
CN          101775481 A     7/2010
(Continued)

OTHER PUBLICATIONS

Nov. 5, 2013 International Search Report issued in International Patent Application No. PCT/JP2013/073558.
(Continued)

*Primary Examiner* — Scott R Kastler
(74) *Attorney, Agent, or Firm* — Oliff PLC

(57) ABSTRACT

In a continuous annealing line for steel sheets comprising a heating zone, a soaking zone and a cooling zone, two or more induction heating devices are arranged in series in a front half part of the heating zone, and a heating stop region of 1~30 m in length or a slow heating region having a heating rate of more than 0° C./s but not more than 10° C./s is provided in a temperature zone that the temperature of the steel sheet between two or more induction heating devices is 250° C. to 600° C. Even if the steel sheet is rapidly heated at a heating rate of not less than 50° C./s with such a rapid heating apparatus of the heating zone, the temperature distribution in the steel sheet is uniformized to realize the quality improvement of steel sheet shape or magnetic properties and so on.

4 Claims, 2 Drawing Sheets

(51) Int. Cl.
*C21D 1/42* (2006.01)
*C22C 38/00* (2006.01)
*C22C 38/02* (2006.01)
*C22C 38/60* (2006.01)
*C22C 38/04* (2006.01)
*C22C 38/06* (2006.01)
*C21D 8/12* (2006.01)
*C21D 1/26* (2006.01)
*C21D 9/00* (2006.01)
*H01F 1/16* (2006.01)

(52) U.S. Cl.
CPC ......... *C21D 8/1244* (2013.01); *C21D 9/0006* (2013.01); *C21D 9/46* (2013.01); *C22C 38/00* (2013.01); *C22C 38/001* (2013.01); *C22C 38/008* (2013.01); *C22C 38/02* (2013.01); *C22C 38/04* (2013.01); *C22C 38/06* (2013.01); *C22C 38/60* (2013.01); *H01F 1/16* (2013.01); *Y02P 10/253* (2015.11)

(58) Field of Classification Search
USPC ........................................................ 266/104
See application file for complete search history.

(56) References Cited

U.S. PATENT DOCUMENTS

| | | | |
|---|---|---|---|
| 2010/0218911 A1* | 9/2010 | Zhang | ............... C21D 1/74 164/460 |
| 2015/0211089 A1* | 7/2015 | Fukunaga | ............. C22C 38/001 266/249 |

FOREIGN PATENT DOCUMENTS

| | | |
|---|---|---|
| EP | 2133436 A1 | 12/2009 |
| EP | 2213754 A1 | 8/2010 |
| JP | H01-290716 A | 11/1989 |
| JP | 2003-328039 A | 11/2003 |
| JP | 2005-120409 A | 5/2005 |
| JP | 2008-001979 A | 1/2008 |
| JP | 2008-266727 A | 11/2008 |
| JP | 2010-163634 A | 7/2010 |
| WO | 2008/126911 A1 | 10/2008 |

OTHER PUBLICATIONS

Oct. 10, 2015 Office Action issued in Chinese Patent Application No. 201380045553.2.
Dec. 4, 2015 Extended Search Report issued in European Patent Application No. 13832537.8.
Apr. 12, 2016 Office Action issued in Korean Patent Application No. 10-2015-7003511.
Jun. 3, 2016 Office Action issued in Russian Patent Application No. 2015112141.
Sep. 26, 2016 Office Action issued in Canadian Patent Application No. 2,883,406.
Jun. 29, 2016 Office Action issued in Japanese Patent Application No. JP2012-192936.
Sep. 30, 2016 Office Action issued in Korean Patent Application No. 10-2015-7003511.
Jun. 29, 2016 Office Action issued in Japanese Patent Application No. JP2012-192940.
Jun. 5, 2017 Office Action issued in Canadian Patent Application No. 2,883,406.

* cited by examiner

RAPID HEATING APPARATUS OF CONTINUOUS ANNEALING LINE

TECHNICAL FIELD

This invention relates to a rapid heating apparatus in a continuous annealing line of a steel sheet, and more particularly to a rapid heating apparatus in a continuous annealing line usable for primary recrystallization annealing of a grain-oriented electrical steel sheet.

RELATED ART

Recently, the heating rate in the annealing of cold rolled steel sheets tends to be made rapid as disclosed in Patent Document 1. In particular, it becomes common to perform rapid heating in primary recrystallization annealing of grain-oriented electrical steel sheets used as a core material of transformers, electric instruments and the like. A main purpose thereof lies in that not only the production efficiency is improved by shortening the heating time but also the rapid heating anticipates the effect of developing specific texture to improve magnetic properties as mentioned later.

In general, <111>//ND orientation being high in the stored strain energy preferentially causes recovery or recrystallization in the primary recrystallization process of the cold rolled steel sheet obtained under a high rolling reduction. As a result, when the heating rate is about 10° C./s as usual, the recrystallization texture after the primary recrystallization principally involves <111>//ND orientation, whereas as the heating rate is made higher than the above value, the steel sheet is heated to a high temperature causing the recrystallization before <111>//ND orientation causes recovery, so that a hardly recrystallizing <110>//ND orientation also causes primary recrystallization. Consequently, <110>//ND orientation or Goss orientation ({110}<001>) in the product sheet after secondary recrystallization is increased and at the same time the grain size is refined to improve iron loss property.

In the aforementioned rapid heating, however, it is necessary to strictly control the heating conditions such as heating temperature, heating time and the like. Because, if variation of the temperature distribution is existent in the steel sheet during the heating for primary recrystallization annealing, the texture of the steel sheet is changed after the primary recrystallization annealing, which further affects secondary recrystallized texture after finish annealing to increase variation in magnetic properties inside the grain-oriented electrical steel sheet.

Furthermore, as the temperature variation inside the steel sheet, particularly temperature variation in widthwise direction of the sheet becomes larger, when the sheet threads through the annealing equipment, vertical wrinkling or warping is caused in the steel sheet to deteriorate product shape, or when the steel sheet is wound around a transfer roll in a furnace, narrowing is caused, and serious operation troubles such as breakage of the steel sheet in the furnace and the like are caused in the worst case.

As a technique of strictly controlling the temperature in the steel sheet, for example, Patent Document 2 discloses a technique that discontinuity of heating among two or more induction heating devices is made minimum by arranging a heating compensation member composed of a conductive material in a connection part between coil cases of the respective induction heating devices to effectively utilize a leakage magnetic flux from the induction heating coil.

PRIOR ART DOCUMENTS

Patent Documents
  Patent Document 1: JP-A-H01-290716
  Patent Document 2: JP-A-2008-266727

SUMMARY OF THE INVENTION

Task to be Solved by the Invention

Even in the technique of Patent Document 2, however, it is actual that the temperature variation in the steel sheet, particularly in the widthwise direction thereof is apt to be easily caused in the case of rapid heating such as induction heating. As a result, the rapid heating causes not only the change in the shape of the steel sheet, generation of poor shape resulted therefrom, operation troubles and so on but also variation in magnetic properties of a product coil, which is a cause of deteriorating the quality of a product sheet.

The invention is made in order to solve the problems inherent to the conventional techniques and is to provide a rapid heating apparatus in a continuous annealing line wherein temperature distribution in the steel sheet, particularly in the widthwise direction thereof can be uniformized to realize the improvement of the quality such as shape of steel sheet, magnetic properties and so on even if the steel sheet is rapidly heated in the induction heating device.

Solution for Task

The inventors have made various studies on the construction and arrangement of induction heating devices disposed in a heating zone of a continuous annealing line in order to solve the above task. Consequently, it has been found that it is effective to arrange two or more induction heating devices in a front half portion of the heating zone and provide a heating stop region of temporarily stopping the heating or a slow heating region of slowly performing the heating (hereinafter referred to as "heating rate adjusting region" collectively) between the induction heating devices for uniformizing the temperature distribution in the steel sheet and the invention has been accomplished.

That is, the invention is a rapid heating apparatus in a continuous annealing line of a steel sheet comprising a heating zone, a soaking zone and a cooling zone, characterized in that two or more induction heating devices are arranged in series in a front half portion of the heating zone and a heating rate adjusting region is provided between the two or more induction heating devices.

The rapid heating apparatus according to the invention is characterized in that the heating rate adjusting region is a heating stop region.

Also, the rapid heating apparatus according to the invention is characterized in that the heating rate adjusting region is a slow heating region.

Further, the rapid heating apparatus according to the invention is characterized in that the heating rate adjusting region is provided with a heating device of heating the steel sheet at a heating rate of more than 0° C./s but not more than 10° C./s.

The rapid heating apparatus according to the invention is characterized in that the heating rate adjusting region is disposed in a temperature zone where the steel sheet is 250~600° C.

Also, the rapid heating apparatus according to the invention is characterized in that the heating rate adjusting region has a length of 1~30 m.

Further, the rapid heating apparatus according to the invention is characterized in that the steel sheet is heated at a heating rate of not less than 50° C./s in the region provided with this device.

The rapid heating apparatus according to the invention is characterized in that the steel sheet to be heated is a final cold rolled material for electrical steel sheet containing Si: not more than 8.0 mass %.

Effect of the Invention

According to the invention, two or more induction heating devices are arranged in series in the front half portion of the heating zone of the continuous annealing line and the heating rate adjusting region of 1~30 m for stopping the heating or slowly performing the heating is provided between the two or more induction heating devices, whereby the uniformization of the temperature in the steel sheet is promoted in this region to mitigate the temperature variation in the widthwise direction due to the rapid heating, so that sheet threading troubles such as poor shape of steel sheet, narrowing and the like and variation of magnetic properties in the steel sheet can be decreased significantly. Furthermore, according to the invention, the heating rate adjusting region is provided on the way of the heating, whereby an adequate amount of strain energy stored in <1114/ND orientation can be released to relatively increase an existing ratio of <1104/ND orientation to <1114/ND orientation in the primary recrystallized texture, so that the effect of improving the magnetic properties by the rapid heating can be further enhanced as compared to the conventional technique.

EMBODIMENTS FOR CARRYING OUT THE INVENTION

The rapid heating apparatus according to the invention will be described concretely by taking a case of applying to a continuous annealing line for primary recrystallization annealing of a grain-oriented electrical steel sheet as an example below.

Figure 1:
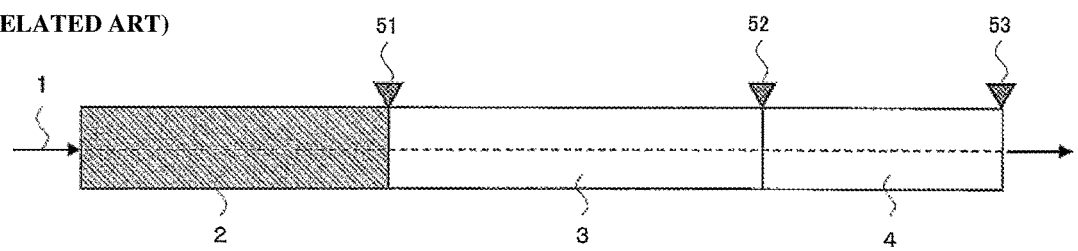
FIG. 1 is a schematic view illustrating a construction of a continuous annealing line in the conventional technique.

FIG. 1 schematically shows a general constitution example of a furnace part of a continuous annealing line used for subjecting a grain-oriented electrical steel sheet cold rolled to a final thickness (product thickness) to a primary recrystallization annealing or a primary recrystallization annealing combined with decarburization annealing. The furnace part of the continuous annealing line is commonly comprised of a heating zone 2 of a radiant tube heating system, a soaking zone 3 of an electric heater heating system and a cooling zone 4. A steel sheet 1 transported from an entrance side of the heating zone 2 (left side of FIG. 1) to the inside of the furnace is heated to a given soaking temperature in the heating zone 2, kept at the soaking temperature in the soaking zone 3 for a given time, cooled to about room temperature in the cooling zone 4, and then carried out to the outside of the furnace (right side of FIG. 1). In FIG. 1 is shown the behavior of transporting the steel sheet through the inside of the horizontal type furnace in the horizontal direction, but the steel sheet may be reciprocally moved in the furnace through a plurality of transporting rolls disposed up and down or right and left inside the furnace to perform heat treatment. Moreover, the temperature of the steel sheet is controlled, for example, by a sheet temperature measuring device 51~53 or the like arranged in an exit side of the each zone.

Figure 2:
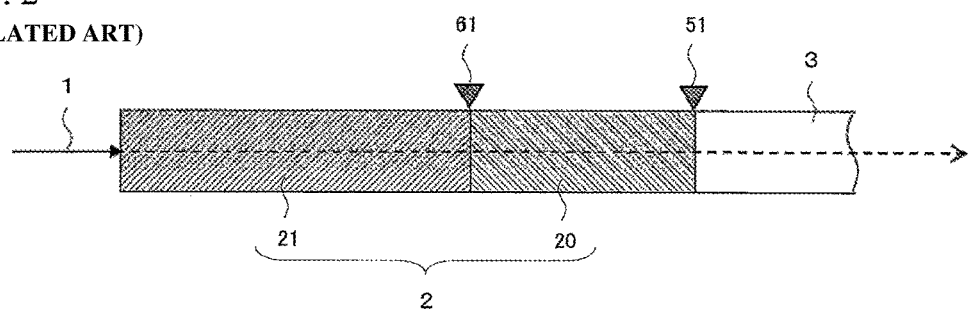
FIG. 2 is a schematic view illustrating a rapid heating apparatus with an induction heating device.

FIG. 2 shows the heating zone of the conventional technique wherein an induction heating device 21 capable of performing rapid heating is arranged before a heating zone 20 of a radiant tube heating system to perform rapid heating from room temperature to a given temperature at once and thereafter the heating is performed to a soaking temperature with a radiant tube.

The reason why the magnetic properties are improved by rapidly heating with the induction heating device as mentioned above is due to the fact that the generation of Goss orientation ({110}<001> orientation) in <110>//ND as nuclei for secondary recrystallization can be promoted by the rapid heating as previously mentioned to thereby refine secondary recrystallized texture.

However, when the steel sheet is heated by using the induction heating device as shown in FIG. 2 in the heating zone as previously mentioned, the temperature distribution in the steel sheet, particularly in the widthwise direction thereof becomes easily non-uniform because the heating rate of the steel sheet is high. For example, the temperature difference in the widthwise direction (highest temperature-lowest temperature) as measured by a sheet temperature measuring device 61 disposed at an exit side of an induction heating device 21 of FIG. 2 may come up to 150° C. Consequently, vertical wrinkling, warping or the like is caused in the steel sheet to deteriorate the shape of the product, or the steel sheet is wound around a transporting roll in the furnace to cause narrowing and serious operation troubles such as breakage of the steel sheet in the furnace and so on are caused in the worst case.

Figure 3:
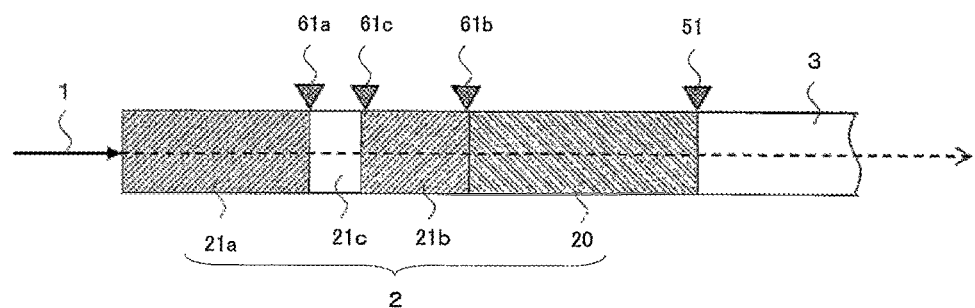
FIG. 3 is a schematic view illustrating a rapid heating apparatus according to the invention.

In order to solve the above problems, therefore, according to the invention, the induction heating device 21 of FIG. 2 is divided into two apparatuses 21a and 21b, and these apparatuses are separately arranged through a duct portion 21c, and a heating stop region is provided on the way of a region performing rapid heating as shown in FIG. 3. By providing the heating stop region is kept the steel sheet at a given temperature on the way of the heating for a given time, so that the non-uniform temperature in the steel sheet, particularly in the widthwise direction thereof is mitigated by thermal diffusion and hence it is possible not only to improve the poor shape but also to reduce variation in the magnetic properties.

Figure 4:
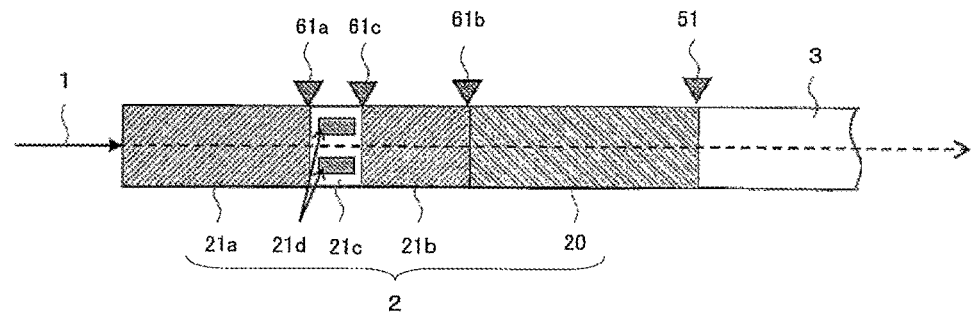
FIG. 4 is a schematic view illustrating another rapid heating apparatus according to the invention.

Alternatively, the induction heating device 21 of FIG. 2 is divided into two apparatuses 21a and 21b, and these apparatuses are separately arranged through a duct portion 21c, and a slow heating region is provided on the way of a region performing rapid heating as shown in FIG. 4. It is preferable that the duct portion 21c as the slow heating region is provided in its inside with a pair of heating devices 21d capable of slowly heating the steel sheet at a heating rate of more than 0° C./s but not more than 10° C./s, which are, for example, arranged so as to face to front and rear faces of the steel sheet. By providing these heating devices can be mitigated the temperature variation in the steel sheet, particularly in the widthwise direction thereof more effectively as compared to the heating device of FIG. 3 having no pair of heating devices. As a result, it is possible not only to mitigate the non-uniform temperature in the steel sheet, particularly in the widthwise direction thereof to improve the poor shape but also to further decrease the variation in the magnetic properties.

The inventors consider the mechanism of improving the temperature variation with such a heating device as follows.

At first, when the slow heating region with a certain length is provided between the induction heating devices as one of the constructional features according to the invention, the temperature variation in the steel sheet formed by the induction heating zone is reduced by thermal diffusion when the steel sheet passes through the slow heating region. Further, when heating means such as heater or the like as another constructional feature according to the invention is disposed in the slow heating region, the effect of uniformizing the temperature in the widthwise direction by the heating means is joined in addition to the above thermal diffusion in the steel sheet, so that a temperature rising margin in the high temperature portion of the steel sheet is small, while a temperature rising margin in the low temperature portion becomes larger and hence the heating may be performed while positively mitigating the temperature variation. As a result, it is possible to more reduce the temperature variation as compared to the case of providing no heating means.

The heating means of the heating device 21d is not particularly limited, and any means such as electric heater, radiant tube, high-temperature gas blowing and the like may be used as long as the temperature variation in the steel sheet can be mitigated.

The reason why the magnetic properties are further improved by providing the duct portion 21c, i.e. the heating stop region or slow heating region (heating rate adjusting region) as compared to the conventional rapid heating is due to the fact that an adequate amount of the stored strain energy of <111>//ND orientation can be released by providing the heating rate adjusting region on the way of the heating process and the existing ratio of <110>//ND orientation to <111>//ND orientation in the primary recrystallized texture can be further relatively enhanced as compared to the conventional technique.

It is preferable that the duct portion 21c is provided in a temperature zone of 250° C. to 600° C. for obtaining the above improving effect. Because, the invention is based on a technical idea that recrystallization superiority of <111>//ND is decreased by keeping at a temperature zone of causing decrease of dislocation density and no recrystallization for a short time or slowly heating such a zone. Therefore, the above effect is not obtained in a zone of lower than 250° C. anticipating substantially no movement of dislocation, while when the zone exceeds 600° C., recrystallization of <111>//ND starts and hence the generation of {110}<001> orientation cannot be promoted even if the temperature of higher than 600° C. is kept or the slow heating is performed at such a temperature. The lower limit of the temperature in the region providing the duct portion is more preferably not lower than 350° C., further preferably not lower than 400° C., while the upper limit thereof is more preferably not higher than 550° C., further preferably not higher than 520° C.

Also, the length of the duct portion 21c or the length of the heating rate adjusting region is preferable to be in a range of 1~30 m. When the length is less than 1 m, the time of stopping the heating (keeping at a constant temperature) or the slow heating time is too short, and the temperature uniformization in the steel sheet is not sufficient and the effect of improving the shape or magnetic properties is not obtained. While, when it exceeds 30 m, the heating stop time or the slow heating time becomes too long and the recovery of the rolled structure is promoted and hence there is a risk of causing poor secondary recrystallization. Incidentally, the time of the heating stop or the slow heating (time required for passing the steel sheet through the duct portion 21c) is preferable to be a range of 1~10 seconds. The lower limit of the length of the heating rate adjusting region is more preferably not less than 3 m, further preferably not less than 5 m, while the upper limit thereof is more preferably not more than 20 m, further preferably not more than 10 m.

In order to obtain the effect of improving the magnetic properties, the region of performing the rapid heating with the induction heating device is preferable to be a temperature region from room temperature to at least 700° C. The reason why the upper limit is 700° C. is due to the fact that the temperature of preferentially recrystallizing <111>//ND is not higher than 700° C. and if the rapid heating is performed up to a temperature exceeding 700° C., not only the effect of improving the magnetic properties is saturated, but also the energy required for heating is undesirably increased.

Also, in order to obtain the effect of improving the magnetic properties, the heating rate in the region arranging the induction heating device is preferable to be not less than 50° C./s. When it is less than 50° C./s, the effect of improving the magnetic properties is not sufficient. However, when the rapid heating is performed at a rate of not less than 350° C./s, the effect of improving the magnetic properties is saturated, so that the upper limit is preferable to be about 350° C./s. The lower limit of the heating rate is more preferably not less than 60° C./s, further preferably not less than 70° C./s. while the upper limit thereof is more preferably not more than 300° C./s, further preferably not more than 250° C./s. Moreover, the heating rate means an average heating rate of a heating time obtained by subtracting a time of the heating stop region or the slow heating region from a time of heating from room temperature to at least 700° C.

Although the above is described on a case that the induction heating device 21 is divided into two parts 21a and 21b, the induction heating device in each of 21a and 21b may be one or may be comprised of plural parts. When it is comprised of plural parts, the induction heating device in each of 21a and 21b on the side of the duct portion 21c is movable in the carrying direction of the steel sheet. For example, the induction heating device constituting 21a is moved toward the side of 21b or the induction heating device constituting 21b is moved toward the side of 21a, whereby the position of the duct portion 21c, i.e. the temperature zone of the heating stop region or the slow heating region may be varied.

By applying the rapid heating apparatus according to the invention to the continuous annealing of the steel sheet subjected to the rapid heating as mentioned above, not only the shape of the steel sheet can be improved, but also the texture after the recrystallization can be controlled, so that it is effective to apply to primary recrystallization annealing of a final cold rolled sheet for a grain-oriented electrical steel sheet containing not more than 8.0 mass % of Si or primary recrystallization annealing combined with decarburization annealing thereof, or to annealing of a final cold rolled sheet for a non-oriented electrical steel sheet. Moreover, the Si content is preferably not less than 1.5 mass %, more preferably not less than 2.5 mass %, while the upper limit thereof is more preferably not more than 6.0 mass %, further preferably not more than 4.0 mass %.

EXAMPLE 1

A cold rolled steel sheet with a final thickness of 0.3 mm produced from a slab comprising C: 0.070 mass %, Si: 3.35 mass %, Mn: 0.10 mass %, Al: 0.025 mass %, N: 0.012 mass %, S: 0.01 mass %, Se: 0.01 mass %, Sb: 0.01 mass %, Sn: 0.05 mass % and the remainder being Fe and inevitable impurities is subjected to primary recrystallization annealing combined with decarburization annealing with a continuous annealing furnace constructed with a heating zone, a soaking zone and a cooling zone. The heating zone of the continuous annealing furnace is designed so as to arrange an induction heating device 21 before a heating zone 20 of radiant tube heating system and further divide the induction heating device 21 into two parts 21a and 21b relatively movable into a carrying direction of the steel sheet and provide a duct portion 21c as a heating stop region between 21a and 21b as shown in FIG. 3.

Figure 5:
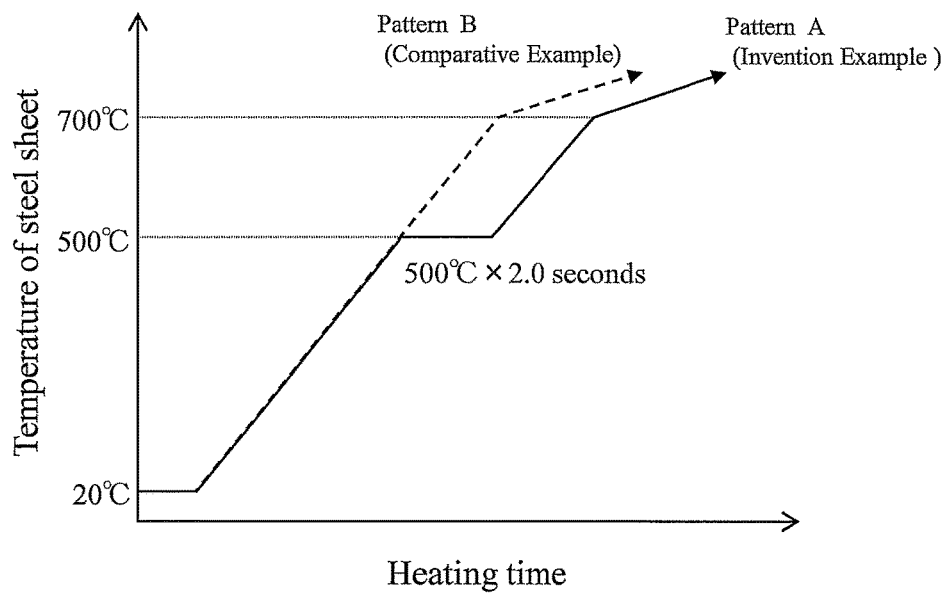
FIG. 5 is a diagram explaining a heating pattern of Example 1 with the rapid heating apparatus of FIG. 3.

The heating with the above heating equipment is performed by two heating patterns as described in FIG. 5 and the followings.

Pattern A: A heating pattern of the invention wherein a duct portion 21c of about 2.5 m (heating stop region) is provided between induction heating devices 21a and 21b and the sheet is heated from room temperature (20° C.) to 500° C. at 75° C./s in the first 21a, kept at a temperature of 500° C. for about 2 seconds in the duct portion 21c, heated to 700° C. at 75° C./s in the subsequent 21b and thereafter heated up to a soaking temperature of 850° C. at an average heating rate of 15° C./s with a radiant tube.

Pattern B: A heating pattern of the conventional technique wherein the sheet is heated from room temperature (20° C.) to 700° C. at 75° C./s at once without providing a duct portion (heating stop region) between induction heating devices 21a and 21b and thereafter heated up to a soaking temperature of 850° C. at an average heating rate of 15° C./s with a radiant tube.

In this case, a temperature distribution of the steel sheet in its widthwise direction is measured by sheet temperature measuring devices 61a, 61c and 61b disposed in an exit side of the induction heating device 21a, an exit side of the duct portion 21c and an exit side of the induction heating device 21b to determine a difference between highest temperature and lowest temperature, and at the same time the shape of the steel sheet at the exit side of the induction heating device 21b is measured with a laser displacement gauge to determine a steepness.

Thereafter, the steel sheet subjected to primary recrystallization annealing combined with decarburization annealing according to the above heating pattern is coated on its steel sheet surface with an annealing separator, dried, subjected to finish annealing and further to flattening annealing combined with baking and shape correction of an insulating film according to usual manner to obtain a product sheet of a grain-oriented electrical steel sheet.

Test specimens are taken out from the product sheet thus obtained at 5 places in total of a leading end and a tailing end of a coil and positions of ¼, 2/4 and ¾ from the leading end over full length of the coil, and magnetic flux density $B_8$ and iron loss $W_{17/50}$ thereof are measured according to an Epstein method defined in JIS C2550. Among the measured values, poorest magnetic flux density $B_8$ and iron loss $W_{17/50}$ are made a guarantee value in the coil.

The results are shown in Table 1. As seen from these results, the temperature difference in the widthwise direction of the steel sheet during the heating is largely mitigated, and hence not only the shape of the steel sheet is made stable to improve the sheet threading performance through the annealing equipment, but also the scattering of the magnetic properties in the steel sheet is decreased to improve the guarantee value in the coil.

TABLE 1

| | Temperature difference in widthwise direction (° C.) | | | | Guarantee value in coil | | |
|---|---|---|---|---|---|---|---|
| Heating pattern | Temperature difference at exit side of induction heating device 21a (° C.) | Temperature difference at exit side of duct portion 21c (° C.) | Temperature difference at exit side of induction heating device 21b (° C.) | Evaluation of steel sheet shape (steepness) (%) | Magnetic flux density $B_8$ (T) | Iron loss $W_{17/50}$ (W/kg) | Remarks |
| A | 60 | 29 | 22 | 0.6 | 1.930 | 0.947 | Invention Example |
| B | 60 | — | 38 | 1.2 | 1.927 | 0.958 | Comparative Example |

EXAMPLE 2

A cold rolled steel sheet with a final thickness of 0.3 mm produced from a slab comprising C: 0.070 mass %, Si: 3.35 mass %, Mn: 0.10 mass %, Al: 0.025 mass %, N: 0.012 mass %, S: 0.01 mass %, Se: 0.02 mass %, Sb: 0.02 mass %, Sn: 0.02 mass % and the remainder being Fe and inevitable impurities is subjected to primary recrystallization annealing combined with decarburization annealing with a continuous annealing furnace constructed with a heating zone, a soaking zone and a cooling zone. The heating zone of the continuous annealing furnace is designed so as to arrange an induction heating device 21 before a heating zone 20 of radiant tube heating system and further constitute the induction heating device 21 with two parts 21a and 21b relatively movable into a carrying direction of the steel sheet and provide a duct portion 21c with a heating device 21d capable of slowly heating the steel sheet between 21a and 21b as shown in FIG. 4.

Figure 6:
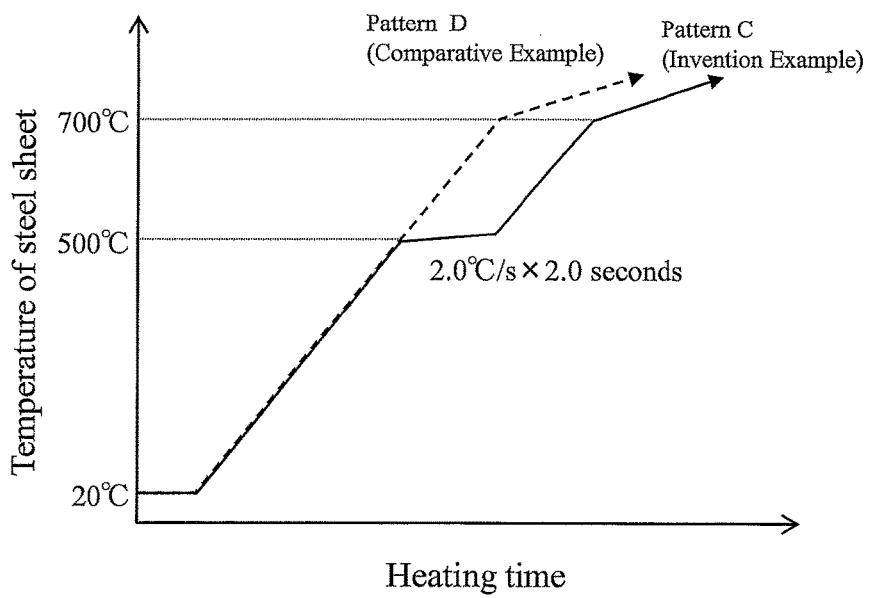
FIG. 6 is a diagram explaining a heating pattern of Example 2 with the rapid heating apparatus of FIG. 4.

The heating with the above heating equipment is performed by two heating patterns as described in FIG. 6 and the followings.

Pattern C: A heating pattern of the invention wherein a duct portion 21c of about 2.5 m (slow heating region) is provided between induction heating devices 21*a* and 21*b* and the sheet is heated from room temperature (20° C.) to 500° C. at 75° C./s in the first 21*a*, slowly heated at a heating rate of 2.0° C./s for 2.0 seconds in the duct portion 21*c*, heated to 700° C. at 75° C./s in the subsequent 21*b* and thereafter heated up to a soaking temperature of 850° C. at an average heating rate of 15° C./s with a radiant tube.

Pattern D: A heating pattern of the conventional technique wherein the sheet is heated from room temperature (20° C.) to 700° C. at 75° C./s at once without providing a duct portion 21*c* (slow heating region) between induction heating devices 21*a* and 21*b* and thereafter heated up to a soaking temperature of 850° C. at an average heating rate of 15° C./s with a radiant tube.

In this case, a temperature distribution of the steel sheet in its widthwise direction is measured by sheet temperature measuring devices 61*a*, 61*c* and 61*b* disposed in an exit side of the induction heating device 21*a*, an exit side of the duct portion 21*c* and an exit side of the induction heating device 21*b* to determine a difference between highest temperature and lowest temperature, and at the same time the shape of the steel sheet at the exit side of the induction heating device 21*b* is measured with a laser displacement gauge to determine a steepness.

Thereafter, the steel sheet subjected to primary recrystallization annealing combined with decarburization annealing according to the above heating pattern is coated on its steel sheet surface with an annealing separator, dried, subjected to finish annealing and further to flattening annealing combined with baking and shape correction of an insulating film according to usual manner to obtain a product sheet of a grain-oriented electrical steel sheet.

Test specimens are taken out from the product sheet thus obtained at 5 places in total of a leading end and a tailing end of a coil and positions of ¼, 2/4 and ¾ from the leading end over full length of the coil, and magnetic flux density $B_8$ and iron loss $W_{17/50}$ thereof are measured according to an Epstein method defined in JIS C2550. Among the measured values, poorest magnetic flux density $B_8$ and iron loss $W_{17/50}$ are made a guarantee value in the coil.

The results are shown in Table 2. As seen from these results, the temperature difference in the widthwise direction of the steel sheet during the heating is largely mitigated, and hence not only the shape of the steel sheet is made stable to improve the sheet threading performance through the annealing equipment, but also the scattering of the magnetic properties in the steel sheet is decreased to improve the guarantee value in the coil.

INDUSTRIAL APPLICABILITY

The rapid heating apparatus according to the invention can change the texture of the steel sheet into preferable properties through the control of the recrystallization behavior. Therefore, the invention is not limited to the field of the grain-oriented electrical steel sheets and can be applied to fields of non-oriented electrical steel sheets requiring the control of the texture, thin steel sheets for automobiles requiring deep drawability, thin steel sheets requiring control of anisotropy and so on.

DESCRIPTION OF REFERENCE SYMBOLS

1: steel sheet (steel band)
2: heating zone
20: radiant tube heating portion of heating zone
21, 21*a*, 21*b*: induction heating device
21*c*: duct portion (heating stop region or slow heating region)
21*d*: slow heating device
3: soaking zone
4: cooling zone
51, 52, 53: sheet temperature measuring device
61*a*, 61*b*, 61*c*: sheet temperature measuring device in induction heating region

The invention claimed is:

1. A method for rapid heating in a continuous annealing line provided with a rapid heating apparatus, the method comprising forming an electrical steel sheet that includes a final cold-rolled material having Si: 8.0 mass % or less by:
   heating the steel sheet at a heating rate of not less than 50° C./s using two or more induction heating devices arranged in series in a front half portion of a heating zone; and
   adjusting a temperature of the heating zone in a heating rate adjusting region provided between two of the two or more induction heating devices by holding temperature constant or slow heating the steel sheet at a heating rate in a range of more than 0° C./s and 10° C./s or less, wherein the heating rate adjusting region has a length in a range of 1 m to 30 m.

2. The method for rapid heating according to claim 1, wherein, in the adjusting step, the temperature is held constant or the steel sheet is slow heated for a duration in a range of 1 to 10 s.

TABLE 2

| | Temperature difference in widthwise direction (° C.) | | | | Guarantee value in coil | | |
|---|---|---|---|---|---|---|---|
| Heating pattern | Temperature difference at exit side of induction heating device 21a (° C.) | Temperature difference at exit side of duct portion 21c (° C.) | Temperature difference at exit side of induction heating device 21b (° C.) | Evaluation of steel sheet shape (steepness) (%) | Magnetic flux density $B_8$(T) | Iron loss $W_{17/50}$ (W/kg) | Remarks |
| C | 60 | 20 | 15 | 0.4 | 1.933 | 0.938 | Invention Example |
| D | 60 | — | 38 | 1.2 | 1.927 | 0.958 | Comparative Example |

3. The method for rapid heating according to claim 1, wherein the length of the heating rate adjusting region is in a range of 3 m to 30 m.

4. The method for rapid heating according to claim 1, wherein the heating rate adjusting region holds the temperature of the steel sheet in a range of 250 to 600° C.

* * * * *